Dec. 16, 1930.  R. R. SEARLES ET AL  1,785,655
VEHICLE SPRING BEARING
Filed March 10, 1925
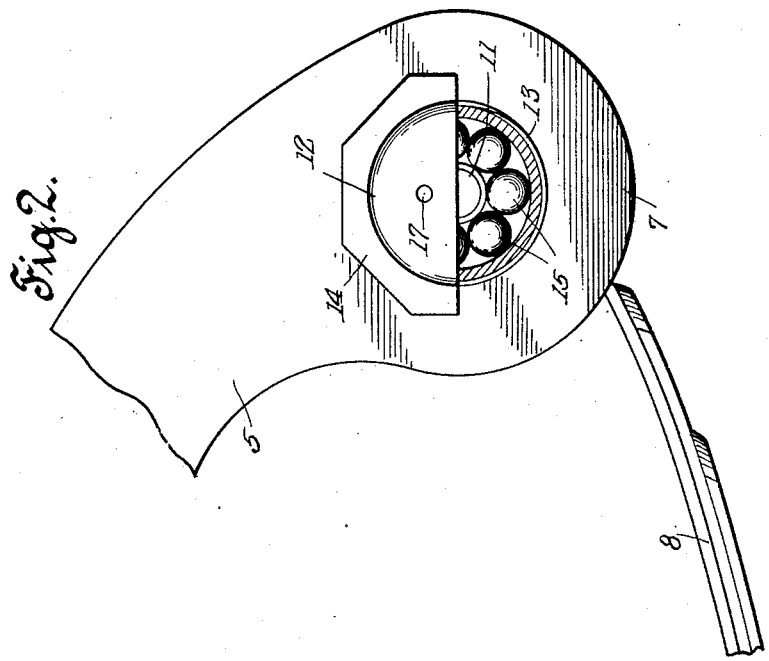
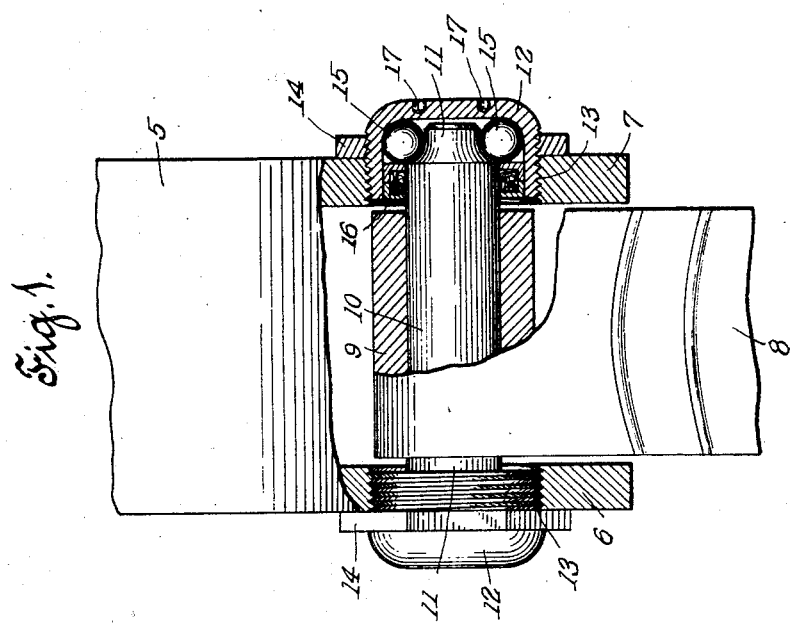
INVENTORS
R. R. Searles
E. H. Cooper
BY
Mitchell Buhut
ATTORNEYS Patented Dec. 16, 1930

1,785,655

UNITED STATES PATENT OFFICE

RAYMOND R. SEARLES AND ELISHA H. COOPER, OF NEW BRITAIN, CONNECTICUT, ASSIGNORS TO THE FAFNIR BEARING COMPANY, OF NEW BRITAIN, CONNECTICUT, A CORPORATION OF CONNECTICUT

VEHICLE SPRING BEARING

Application filed March 10, 1925. Serial No. 14,394.

Our invention relates to a vehicle spring bearing and particularly to a bearing for the hinge end of a vehicle spring.

It is the general object of the invention to provide an anti-friction bearing for a vehicle spring which will be cheap to manufacture, serviceable in use, and easy to assemble. Other minor objects will be apparent as the specification proceeds.

In the drawings, which show for illustrative purposes only, a preferred form of the invention.

Figure 1 is an end view of part of a vehicle frame and spring end, these parts being connected together by means illustrative of our invention, parts being shown in section to illustrate interior construction.

Figure 2 is a view in side elevation of the parts shown in Figure 1, a part being shown in section to illustrate interior construction.

In said drawings, 5 indicates a part of a vehicle frame or the like, which in the form shown, is of channel formation, the legs of the channel being indicated at 6—7. 8 indicates a conventional type of vehicle spring which is to be connected to the vehicle frame. In the preferred embodiment, the spring 8 is provided with the usual spring eye 9 which receives the bearing pin 10, having ends 11—11 projecting laterally from opposite sides thereof.

The spaced members or legs 6—7 of the channeled vehicle frame are apertured to receive the projecting ends 11—11 on the pin 10 and also means for supporting these pin ends. In the illustrative example, the supporting means includes a bearing cup 12 which is preferably formed of heavy sheet metal which may be stamped into the desired form, preferably in the shape of a closed cup. This cup may be secured to the leg 7 by any suitable means, but it is preferred to tap the aperture in the leg 7 and thread the exterior surface of the cup 12 as indicated at 13 so that the cup may be secured to the frame in the desired position of adjustment with the closed end of the cup directed outwardly.

If necessary, or desirable, means such as a lock nut 14 may be used for holding the bearing cup 12 in any predetermined position.

Anti-friction members preferably in the form of balls 15—15 are interposed between the pin ends 11—11 and the respective bearing cups in the legs 6—7 of the frame. If desired, these anti-friction members may ride upon raceways formed directly upon the pin ends and in the bearing cups as illustrated in the drawings.

In order to exclude dust from the anti-friction members we preferably employ a dust ring 16 which, in the form shown, includes a felt washer held in an annular channel which is forced into the open end of the cup. The felt washer bears against the projecting end of the bearing pin and effectively shields the anti-friction members against the entry of dust or water.

In the illustrative example of the invention shown the size of the raceway in the cup and the size of the balls 15—15 are so proportioned that the raceway may be completely filled with balls and when so filled the balls form arches so that the balls themselves retain each other in place against falling out radially of the cup. The dust ring 16 when set in place prevents the balls from falling out axially of the cup, so that the bearing cup with its full quota of balls and the dust ring may be put in place and handled as a unit. If desired, the bearing cup may be provided with means such as the spanner wrench holes 17—17 to facilitate application and removal of the bearing cups.

It will be understood that the construction and arrangement of parts on the leg 6 will be substantially the same as on the leg 7 and a description of the latter suffices for the former.

With the bearing arranged as illustrated in the drawings, the lines connecting the bearing surfaces on the pin ends and the corresponding bearing cups will diverge outwardly so as to form in effect angular contact bearings which take both radial and thrust loads so that the spring 8 may be supported upon the anti-friction members 15—15 and out of contact with the frame 5.

While the invention has been described in some detail, we do not wish to be limited to the exact form and embodiment shown since changes may be made within the scope of the invention as defined in the appended claims.

We claim:

1. In a spring end connection, a frame part having spaced apart members with aligned threaded apertures therein, closed bearing cups having threaded outer surfaces for engagement with said threaded apertures, pin means to be secured to a spring and project beyond the sides thereof, the ends of said pin means projecting beyond the sides of said spring being positioned within said bearing cups, anti-friction bearing members interposed between said cups and ends of said pin means, lubricant retaining and dust excluding rings carried bodily by said bearing cups and engaging over said pin means inwardly of the ends thereof to seal said anti-friction bearing members in said cups, said cups being formed of metal of substantially uniform thickness throughout, means for locking said bearing cups in place in threaded engagement with said spaced apart members, said bearing cups together with said anti-friction bearing members and dust rings being removable as units from said spaced apart members.

2. In a spring end connection, a frame part having spaced apart members with aligned threaded apertures therein, closed bearing cups having threaded outer surfaces for engagement with said threaded apertures, pin means to be secured to a spring and project beyond the sides thereof, the ends of said pin means projecting beyond the sides of said spring being positioned within said bearing cups, anti-friction bearing members interposed between said cups and ends of said pin means, lubricant retaining and dust excluding rings carried bodily by said bearing cups and engaging over said pin means inwardly of the ends thereof to seal said anti-friction bearing members in said cups, means for locking said bearing cups in place in threaded engagement with said spaced apart members, said bearing cups together with said anti-friction bearing members and dust rings being removable as units from said spaced apart members, the outer ends of said bearing cups being extended outwardly beyond said spaced apart members and said anti-friction bearing members being in engagement with said cups outwardly of spaced apart members, whereby said anti-friction bearing members will not be cramped due to any distortion of said bearing cups when the latter engage said spaced apart members.

RAYMOND R. SEARLES.
ELISHA H. COOPER.